United States Patent
Sakamoto et al.

(10) Patent No.: US 8,305,870 B2
(45) Date of Patent: Nov. 6, 2012

(54) OPTICAL INFORMATION RECORDING METHOD, OPTICAL INFORMATION REPRODUCING METHOD, OPTICAL INFORMATION RECORDING APPARATUS, AND OPTICAL INFORMATION RECORDING AND REPRODUCING APPARATUS

(75) Inventors: Tetsuhiro Sakamoto, Kanagawa (JP); Hisayuki Yamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/156,625

(22) Filed: Jun. 9, 2011

(65) Prior Publication Data
US 2011/0310723 A1 Dec. 22, 2011

(30) Foreign Application Priority Data
Jun. 18, 2010 (JP) .................. P2010-139372

(51) Int. Cl.
*G11B 7/00* (2006.01)
(52) U.S. Cl. ................... 369/124.03; 369/121
(58) Field of Classification Search .............. None
See application file for complete search history.

(56) References Cited

U.S. PATENT DOCUMENTS 6,970,414 B1 * 11/2005 Pavel .................. 369/275.1
2009/0245077 A1 10/2009 Ueda et al.
2009/0303857 A1 * 12/2009 Nakatani et al. ......... 369/112.23
2010/0046338 A1 2/2010 Saito et al.

FOREIGN PATENT DOCUMENTS

JP 2008-071433 3/2008
JP 2009-238282 10/2009

OTHER PUBLICATIONS

Goeppert-Mayer, "On Elementary Process With Two Quatun Transitions", Ann. Phys. 9, 1931, p. 273.

* cited by examiner

*Primary Examiner* — Paul Huber
(74) *Attorney, Agent, or Firm* — K&L Gates LLP (57) ABSTRACT

An optical information recording method includes emitting light having a wavelength $\lambda 1$ from a first light source with a pulse width of time tw1 or more and power P1, emitting light having a wavelength $\lambda 2$ from a second light source with a pulse width of time tw2, a repetition interval T, and power P2, and performing information recording by simultaneously irradiating an identical part of a recording medium with the light from the first light source and the light from the second light source, in which the wavelength $\lambda 1$ and the wavelength $\lambda 2$ satisfy $\lambda 1 > 500$ nm $> \lambda 2$ and $\lambda 0$ which is expressed as $1/\lambda 1 + 1/\lambda 2 = 1/\lambda 0$ satisfies a relationship of $\lambda 0 < 300$ nm, and emission of the first light source and emission of the second light source satisfy relationships of tw2<tw1, T<tw1, and P2>P1.

9 Claims, 4 Drawing Sheets

FIG. 1

OPTICAL INFORMATION RECORDING METHOD, OPTICAL INFORMATION REPRODUCING METHOD, OPTICAL INFORMATION RECORDING APPARATUS, AND OPTICAL INFORMATION RECORDING AND REPRODUCING APPARATUS

CROSS REFERENCES TO RELATED APPLICATIONS

The present application claims priority to Japanese Priority Patent Application JP 2010-139372 filed in the Japan Patent Office on Jun. 18, 2010, the entire contents of which are hereby incorporated by reference.

BACKGROUND

The present application relates to an optical information recording method, an optical information reproducing method, an optical information recording apparatus, and an optical information recording and reproducing apparatus by which information is recorded by irradiating a medium with light.

As an example of a technique that dramatically increases recording capacity of an optical recording medium, a volume recording type optical recording medium in which a recording region is expanded in the thickness direction is proposed (for example, Japanese Unexamined Patent Application Publication No. 2008-071433). A recording material of this optical recording medium is a resin material which is a transparent for recording light and reproducing light. As a method for densely forming a recording mark within a transparent resin material, recording light having a wavelength of 405 nm is focused on a desired position and thus the optical intensity is increased on the position so as to develop a non-linear optical effect of the resin material, that is, to develop two-photon absorption and absorb light. A method for forming a void (hole) within a recording material by the two-photon absorption is proposed (for example, Japanese Unexamined Patent Application Publication No. 2009-238282).

In this two-photon absorption phenomenon, absorption efficiency is commonly increased in proportion to a square of optical energy.

The two-photon absorption phenomenon was theoretically proposed by Goeppert-Mayer from Germany in 1931 and was substantiated in an experiment in 1961 (for example, Maria Goeppert-Mayer, Ann. Phys. 9 (1931) 273). This phenomenon is developed by radiating light having a single wavelength and good coherency such as laser light in large optical intensity.

SUMMARY

The two-photon absorption of the wavelength of 405 nm is equivalent to optical absorption of the wavelength of 202.5 nm. The intensity of energy of one photon is far larger than binding energy of organic molecules which constitute a resin material. Therefore, if absorption is developed, fragmentation of the molecules efficiently occurs, being able to form a hole. That is, the absorbed energy can be efficiently converted into energy for forming a hole.

However, the resin material commonly has exceedingly poor two-photon absorption efficiency in the wavelength of 405 nm. Accordingly, extremely large optical energy, that is, extremely large laser power has to be used so as to improve efficiency of the hole formation.

On the other hand, the resin material commonly has large two-photon absorption efficiency in a long wavelength equal to or more than the wavelength of approximately 650 nm. However, energy of one photon is small in the above mentioned wavelength, so that even if optical absorption is developed, fragmentation of molecules does not occur and therefore exothermic reaction is predominantly developed. Therefore, hole formation by heat degradation dominantly occurs compared to hole formation by fragmentation. That is, efficiency for converting absorbed energy into energy for the hole formation is small. Accordingly, more heat quantity, that is, more energy is demanded for the hole formation until an occurrence of heat degradation. Therefore, large laser power or longer laser irradiation time is demanded. Further, in a case of non-linear absorption of three or more photons, absorption efficiency is not increased unless laser power is increased as is the case with the above-described short wavelength. Thus, it is difficult to realize hole formation without large laser power.

As described above, in a case where volume recording by the bulk formation is performed while using a transparent resin material as a recording layer, two-photon absorption efficiency of the material is small in the two-photon absorption using a light source of a short wavelength, so that power of short-wavelength light has to be extremely increased. On the other hand, in the two-photon absorption using a light source of a long wavelength, absorbed energy is not efficiently used for the hole formation, so that power of the long wavelength light has to be remarkably increased or irradiation time has to be increased.

These indicate that the use of a single wavelength, either a short wavelength or a long wavelength, is not necessarily beneficial for the efficient hole formation.

It is desirable to provide an optical information recording method by which a recording mark can be formed in a volume recording type optical information recording medium with low power and an apparatus realizing the optical information recording method.

An optical information recording method according to an embodiment includes emitting light having a wavelength $\lambda 1$ from a first light source with a pulse width of time $tw1$ or more and power $P1$, and emitting light having a wavelength $\lambda 2$ from a second light source with a pulse width of time $tw2$, a repetition interval $T$, and power $P2$. Then, information recording is performed by simultaneously irradiating an identical part of a recording medium with the light from the first light source and the light from the second light source. At this time, the wavelength $\lambda 1$ and the wavelength $\lambda 2$ satisfy $\lambda 1 > 500$ nm $> \lambda 2$ and $\lambda 0$ which is expressed as $1/\lambda 1 + 1/\lambda 2 = 1/\lambda 0$ satisfies a relationship of $\lambda 0 < 300$ nm. Further, emission of the first light source and emission of the second light source satisfy relationships of $tw2 < tw1$, $T < tw1$, and $P2 > P1$.

An optical information reproducing method according to the embodiment includes optically reproducing a signal of a recording mark that is a hole, which is formed by the optical information recording method mentioned above, by light, which has an approximately same wavelength as the wavelength $\lambda 2$ of the light of the second light source, from a third light source.

An optical information recording apparatus according to the embodiment includes a first light source configured to emit light having a wavelength $\lambda 1$ with a pulse width of time $tw1$ or more and power $P1$. Further, the optical information recording apparatus includes a second light source configured to emit light having a wavelength $\lambda 2$ with a pulse width of time $tw2$, a repetition interval $T$, and power $P2$. Information recording is performed by simultaneously irradiating an identical part of a recording medium with the light from the first light source and the light from the second light source. Here, in the optical information recording apparatus of the embodiment, the wavelength λ1 and the wavelength λ2 satisfy λ1>500 nm>λ2 and λ0 which is expressed as 1/λ1+1/λ2=1/λ0 satisfies a relationship of λ0<300 nm. Further, emission of the first light source and emission of the second light source satisfy relationships of tw2<tw1, T<tw1, and P2>P1.

An optical information recording and reproducing apparatus according to the embodiment includes a third light source configured to emit light having an approximately same wavelength as the wavelength λ2 of the light from the second light source in addition to the configuration of the optical information recording apparatus mentioned above. Information that is recorded by the light from the first light source and the light from the second light source is optically reproduced by the light from the third light source.

A perception of two-photon absorption which is widespread depends on a special case where light beams have the same wavelength and are coherent. On the other hand, in the optical information recording method according to the embodiment, two-photon absorption is produced in a recording material by using two light sources of different wavelengths so as to realize low power recording which is not realized in a case using single short wavelength light and realize highly-efficient hole formation that exhibits a superior input energy rate and is not realized in a case using single long wavelength light. Further, the information recorded by the above-mentioned method can be reproduced by the optical information reproducing method of the embodiment.

According to the embodiment, low power recording with respect to an optical information recording medium can be performed by using two light sources of different wavelengths.

Additional features and advantages are described herein, and will be apparent from the following Detailed Description and the figures.

DETAILED DESCRIPTION

Embodiments of the present application will be described below in detail with reference to the drawings.

The description is given in the following order.
1. Example of Optical Information Recording and Reproducing Apparatus
2. Optical Recording Method
3. Optical Recording Method of Embodiment: First Example
4. Optical Recording Method of Embodiment: Second Example
5. Optical Recording Method of Embodiment: Third Example 1. Example of Optical Information Recording and Reproducing Apparatus Configuration of Optical Information Recording and Reproducing Apparatus An optical information recording and reproducing apparatus according to an embodiment will be described below.

Figure 1:
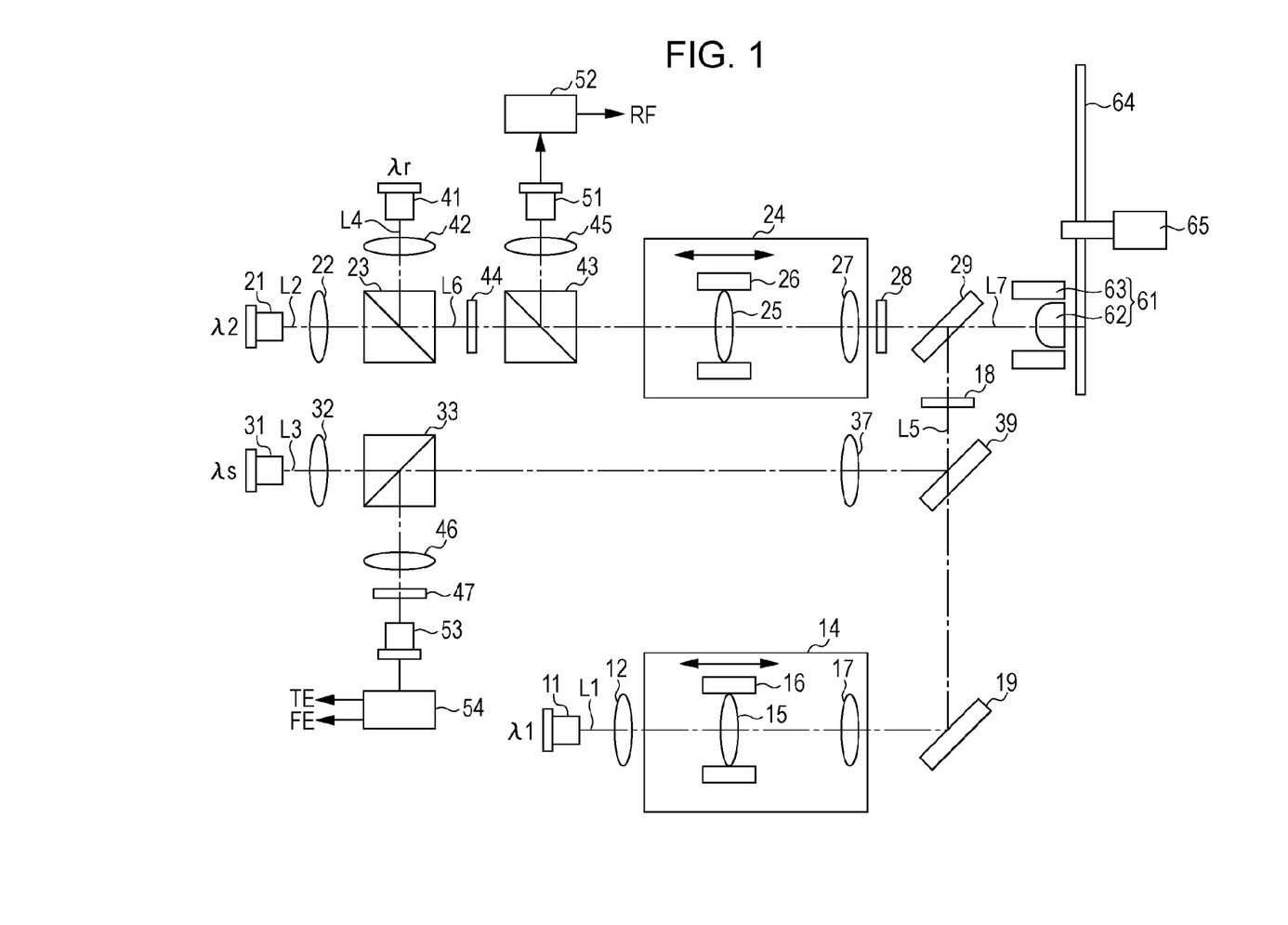
FIG. 1 illustrates the schematic configuration of an optical information recording and reproducing apparatus according to an embodiment.

FIG. 1 is a schematic configuration diagram of an optical information recording and reproducing apparatus.

An optical recording apparatus 10 shown in FIG. 1 includes a first laser light source 11, a second laser light source 21, a third laser light source 31, and a fourth laser light source 41. An optical information recording medium 64 is irradiated with light from the first laser light source 11, the second laser light source 21, the third laser light source 31, and the fourth laser light source 41.

On an optical path L1 of the first laser light source 11, a first collimator lens 12, a first relay lens 14, and a mirror 19 are provided.

The first relay lens 14 is composed of a first condenser lens 15, a first actuator 16, and a second condenser lens 17. The first condenser lens 15 is displaced by the first actuator 16 and laser light is adjusted to be luminous flux having a predetermined divergence angle by the first condenser lens 15 which is displaced and the second condenser lens 17 so as to be emitted to a first dichroic mirror (DCM) 39. The first relay lens 14 adjusts the divergence angle so as to control a focal position of first laser light in the depth direction in the optical information recording medium 64.

On an optical path L2 of the second laser light source 21, a second collimator lens 22, a first polarization beam splitter 23, a half wavelength plate (HWP) 44, a third polarization beam splitter 43, a second relay lens 24, and a second quarter wavelength plate (QWP) 28 are provided.

Further, on an optical path obtained by dividing the optical path L2 by the third polarization beam splitter 43, a sixth condenser lens 45 and a first photo detector (PD) 51 are provided. Further, a first signal processing unit 52 that processes a signal, which is photoelectrically converted by the first PD 51, so as to output a reproduction signal (RF) is provided.

On an optical path L3 of the third laser light source 31, a third collimator lens 32, a second polarization beam splitter 33, and a fifth condenser lens 37 are provided. Further, on an optical path obtained by dividing the optical path L3 by the second polarization beam splitter 33, a seventh condenser lens 46, a wavelength filter (CF) 47, and a second photo detector (PD) 53 are provided. Further, a second signal processing unit 54 that processes a signal which is photoelectrically converted by the second PD 53 so as to produce a tracking error signal (TE) and a focus error signal (FE) for controlling a position of an objective lens 62 is provided.

On an optical path L4 of the fourth laser light source 41, a fourth collimator lens 42 and the first polarization beam splitter 23 are provided.

The optical path L4 of the fourth laser light source 41 is reflected at a reflection plane of the first polarization beam splitter 23 so as to be aligned with the optical path L2, which passes through the first polarization beam splitter 23, of the second laser light source 21 on the same axis. Accordingly, the optical path L2 of the second laser light source 21 and the optical path L4 of the fourth laser light source 41 are aligned with an optical path L6 on the same axis.

The second relay lens 24 is composed of a third condenser lens 25, a second actuator 26, and a fourth condenser lens 27. The third condenser lens 25 is displaced by the second actuator 26 and laser light is adjusted to be luminous flux having a predetermined divergence angle by the third condenser lens 25 which is displaced and the fourth condenser lens 27 so as to be emitted to the second QWP 28. The second relay lens 24 adjusts the divergence angle so as to control focal positions of the second laser light and the fourth laser light in the depth direction in the optical information recording medium 64.

On an intersection of the optical path L1 of the first laser light source 11 and the optical path L3 of the third laser light source 31, the first dichroic mirror (DCM) 39 that allows the first laser light to pass therethrough and reflects the third laser light is provided. The third laser light is reflected by the first DCM 39 and thus the optical path L3 is aligned with the optical path L1 of the first laser light, which passes through the first DCM 39, on the same axis. On an optical path L5 on which the optical path L1 of the first laser light source 11 and the optical path L3 of the third laser light source 31 are aligned with each other on the same axis, a first quarter wavelength plate (QWP) 18 is provided.

Further, on an intersection of the optical path L5 of the first laser light source 11 and the third laser light source 31 and the optical path L6 of the second laser light source 21 and the fourth laser light source 41, a second dichroic mirror (DCM) 29 is provided. The second dichroic mirror (DCM) 29 reflects the first laser light and the third laser light and allows the second laser light and the fourth laser light to pass therethrough.

On the second DCM 29, the optical path L6 of the second laser light and the fourth laser light that pass through the second DCM 29 and the optical path L5 of the first laser light and the third laser light that are reflected by the second DCM 29 are aligned with an optical path L7 on the same axis. On the optical path L7 on which the optical paths L6 and L5 are aligned with each other, an objective lens unit 61, the optical information recording medium 64, and a spindle 65 are provided.

The objective lens unit 61 is composed of an objective lens 62 and a third actuator 63 which displaces the objective lens 62. The laser light radiated from the second DCM 29 is made incident on the objective lens 62. The objective lens 62 condenses light such that the incident laser light focuses on the same position on the optical information recording medium 64. The adjustment of a focal position by the objective lens 62 is performed such that the third actuator 63 is controlled based on the tracking error signal (TE) and the focus error signal (FE) from the second signal processing unit 54 described above so as to displace the objective lens 62.

The first laser light source 11 is a laser light source for recording. As the first laser light source, semiconductor laser having a red or infrared wavelength can be used. For example, red continuous wave (CW) laser having a wavelength of 640 nm is used.

The second laser light source 21 generates ultra-short pulse laser light in a predetermined time interval. The ultrashort pulse has a pulse width of femtosecond order to 100 pico second order. As a laser medium, titanium-doped sapphire (Ti:S) crystal is used, for example. The laser light radiated from the first laser light source 11 is linearly polarized laser light.

The third laser light source 31 is used for generating a position controlling signal for controlling a position of the objective lens 62 in recording and reproducing. The third laser light source 31 emits red semiconductor laser, for example. A wavelength $\lambda s$ of the third laser light radiated from the third laser light source 31 can be set to be approximately same as a wavelength $\lambda 1$ of the first laser light radiated from the first laser light source 11. It is sufficient if there is a difference between the wavelength $\lambda s$ and the wavelength $\lambda 1$ to the extent that the third laser light and the first laser light can be separated from each other on the first DCM 39.

The fourth laser light source 41 is used for reading the information which is recorded in the optical information recording medium 64, in reproduction. The fourth laser light source 41 emits blue semiconductor laser, for example. A wavelength $\lambda r$ of the fourth laser light radiated from the fourth laser light source 41 can be set to be approximately same as a wavelength $\lambda 2$ of the second laser light radiated from the second laser light source 21.

As the optical information recording medium 64, a volume recording type optical information recording medium is used. As the optical information recording medium 64 of the volume recording type, an optical disk that has a hole formed at the center thereof and has a diameter of 120 mm and the thickness of 1.2 mm is used, for example. The optical information recording medium 64 includes a substrate, a reference layer which is formed on the substrate, and a recording layer which is formed on the reference layer. The optical information recording medium 64 volume-records information such that laser light is condensed, a recording layer material is altered thermally or in an ablated way by optical energy which is two-photon absorbed near a focal point of the light, and thereby a void (hole) is formed.

The recording layer of the optical information recording medium 64 is made of a photoreactive resin that reacts to recording laser. When the recording laser is radiated, bubbles and the like are generated on the focal position of the laser light due to boiling or resolution of the photoreactive resin. Then, a recording mark RM which is a hole is formed in the recording layer due to the generation of the bubbles and the like and thus the volume recording is performed. The reference layer is formed by providing a dielectric multi-layered film or the like to a servo guide groove which is formed by a stumper, for example. Specifically, a spiral track including a land which is a convex part and a groove which is a concave part is formed. An address which is composed of a series of numbers is attached to the track for every predetermined recording unit, and the track is specified by the corresponding address when information is recorded or reproduced.

Recording

A method for recording information in the optical information recording medium 64 by using the optical information recording and reproducing apparatus described above is now described.

In the recording, the first laser light which is linearly polarized light is emitted from the first laser light source 11 for recording, as shown in FIG. 1. Then, the first laser light is collimated by the first collimator lens 12 and luminous flux of the laser light is adjusted to have a desired divergence angle by the first relay lens 14. Subsequently, the first laser light of which the divergence angle is controlled is reflected by the mirror 19, then passes through the first DCM 39, and is made incident on the first QWP 18. The first laser light incident on the first QWP 18 is converted into circularly polarized light and emitted to the second DCM 29. Then, the first laser light which is emitted to the second DCM 29 is reflected by the second DCM 29 so as to be made incident on the objective lens 62.

Simultaneously to the first laser light source 11, the second laser light which is linearly polarized light is emitted from the second laser light source 21 for recording. Then, the second laser light is collimated by the second collimator lens 22 and passes through the second polarization beam splitter 23 and the third polarization beam splitter 43. Here, in the recording, the HWP 44 which is provided between the second polarization beam splitter 33 and the third polarization beam splitter 43 and is shown in FIG. 1 is not used. Luminous flux of the second laser light which has passed the third polarization beam splitter 43 is adjusted to have a desired divergence angle by the second relay lens 24. Then, the second laser light of which the divergence angle is controlled is converted into circularly polarized light by the second QWP 28, then passes through the second DCM 29, and is made incident on the objective lens 62.

Further, in the recording, the third laser light which is linearly polarized light is emitted from the third laser light source 31, as shown in FIG. 1, so as to highly-accurately control a position of the objective lens with respect to the optical information recording medium 64 which rotates at high velocities. Then, the third laser light is collimated by the third collimator lens 32, then passes through the second polarization beam splitter 33, and luminous flux of the laser light is adjusted to have a desired divergence angle by the fifth condenser lens 37. Then, the third laser light which has passed through the fifth condenser lens 37 is reflected by the first DCM 39 and is made incident on the first QWP 18. The third laser light which is made incident on the first QWP 18 is converted into circularly polarized light and is radiated to the second DCM 29. The third laser light which is emitted to the second DCM 29 is reflected by the second DCM 29 so as to be made incident on the objective lens 62.

Then, the first laser light and the second laser light that are condensed by the objective lens 62 are condensed on an identical part on the recording layer of the optical information recording medium 64. At this time, two-photon absorption occurs on the position that the first laser light and the second laser light are condensed, on the recording layer, and thus a recording mark is formed.

The condensing depths, on the recording layer, of the first laser light and the second laser light are adjusted by the divergence angles of the luminous flux which are respectively adjusted by the first relay lens 14 and the second relay lens 24 which are provided on respective optical paths. Therefore, the divergence angles of the laser light are adjusted by the first relay lens 14 and the second relay lens 24 so as to match the focal point depths of the first laser light and the second laser light.

Further, in the optical information recording medium 64, the third laser light which is condensed by the objective lens 62 passes through the recording layer and the reference layer which is provided on an opposite side of a light incident plane of the recording layer is irradiated with the third laser light. The luminous flux of the third laser light is adjusted by the fifth condenser lens 37 so as to correspond to the depth of the reference layer and thus the third laser light is focused in the depth of the reference layer. Then, the third laser light which is reflected by the reference layer passes through the objective lens 62 and is reflected by the second DCM 29, thus returning in the reverse direction on the optical path L7 and the optical path L5. Then, the third laser light passes through the first QWP 18 and subsequently is reflected by the first DCM 39. Further, the third laser light passes through the fifth condenser lens 37 on the optical path L3 and then is made incident on the second polarization beam splitter 33.

The reflection light of the third laser light which is incident on the second polarization beam splitter 33 is reflected at a reflection plane of the second polarization beam splitter 33 and is emitted to the seventh condenser lens 46. Then, the reflection light of the third laser light is condensed by the seventh condenser lens 46, passes through the CF 47 for suppressing crosstalk with the first laser light which is simultaneously emitted, and is made incident on the second PD 53. The reflection light is photoelectrically converted by the second PD 53, generating various detection signals corresponding to the amount of received light. The various detection signals which are generated are supplied to the second signal processing unit 54 so as to generate a focus error signal (FE) and a tracking error signal (TE) by employing the same method as a common optical disk. By using the focus error signal (FE) and the tracking error signal (TE), the third actuator 63 of the objective lens unit 61 is controlled so as to control the position of the objective lens 62.

Through the above-described method, the optical information recording medium 64 is simultaneously irradiated with the first laser light from the first laser light source 11 and the second laser light from the second laser light source 21, whereby the recording is performed. Further, in the recording, the position of the objective lens 62 is highly-accurately controlled by using the third laser light emitted from the third laser light source 31.

Reproduction

A method for reproducing information which is recorded in the optical information recording medium 64 with the optical information recording and reproducing apparatus described above is now described.

In reproduction, the fourth laser light which is linearly polarized light is emitted from the fourth laser light source 41 as shown in FIG. 1. The fourth laser light is laser light of linearly polarized light which is orthogonal to the second laser light which is emitted in the recording described above.

The fourth laser light is collimated by the fourth collimator lens 42 so as to be made incident on the first polarization beam splitter 23. Then, the fourth laser light which is reflected by the reflection plane of the first polarization beam splitter 23 is converted to be linearly polarized light having the same phase as that of the second laser light by the HWP 44 and then is made incident on the second relay lens 24. The luminous flux of the laser light is adjusted to have a desired divergence angle by the second relay lens 24, and the laser light is converted into circularly polarized light by the second QWP 28, passes through the second DCM 29, and made incident on the objective lens 62.

Further, in the reproduction, the third laser light is emitted from the third laser light source 31, as shown in FIG. 1, so as to highly-accurately control the position of the objective lens with respect to the optical information recording medium 64 which rotates at high speed. The positional control of the objective lens by the third laser light source 31 is similarly performed to the positional control of the objective lens in the recording described above.

In the optical information recording medium 64, the recording layer of the optical information recording medium 64 is irradiated with the fourth laser light which is condensed by the objective lens 62. The fourth laser light which is emitted to the recording layer is condensed on a recording mark RM which is formed on the recording layer by the objective lens 62. The depth of the focal point of the fourth laser light within the recording layer is adjusted by the second relay lens 24 described above. Subsequently, the fourth laser light which is reflected from the recording mark RM passes through the objective lens 62, the second DCM 29, the second QWP 28, and the second relay lens 24 and is made incident on the third polarization beam splitter 43, thus returning in the reverse direction on the optical path L7 and the optical path L6. Then, the fourth laser light is reflected by a reflection plane of the third polarization beam splitter 43, is condensed by the sixth condenser lens 45 and is made incident on the first PD 51 so as to be photoelectrically converted. Accordingly, information which is recorded in the optical information recording medium 64 can be reproduced by the difference of a reflection rate based on a change of an optical constant from the recording mark RM.

Through the above described method, the information recorded in the optical information recording medium 64 can be read out by using the fourth laser light which is radiated from the fourth laser light source 41. Then, in the reproduction, the position of the objective lens 62 can be highly-accurately controlled by using the third laser light radiated from the third laser light source 31.

The above description shows an example of the optical information recording and reproducing apparatus according to the embodiment which includes a recording light source, a reproducing light source, and a light source for controlling a position of an objective lens, but other configurations may be employed. For example, an optical information recording apparatus which includes the first laser light source and the second laser light source as the recording light source and does not include the fourth laser light source serving as the reproducing light source may be employed.

2. Optical Recording Method

A driving method of the first laser light source and the second laser light source in the optical information recording method of the embodiment is now described. In the recording method of the embodiment, theoretical background in which two-photon absorption occurs not only in a case of photons having an identical wavelength but also in a case of photons having different wavelengths from each other is used. The hole formation by the two-photon absorption is enabled also by two-photon absorption using two photons which have different wavelengths from each other, based on the theoretical background of Maria Goeppert-Mayer, Ann. Phys. 9 (1931) 273, described above. Accordingly, in the embodiment, a two-photon absorption phenomenon by two wavelengths is actively used based on this theoretical background of the two-photon absorption.

Semiconductor laser having a red or infrared wavelength can be used as the light from the first laser light source. For example, semiconductor laser which is emitted in a single mode, can be condensed up to a diffraction limited size, and is emitted outward to an object by approximately 500 mW or more (emission duty 50%) is used. Further, light source by which a pulse width can be arbitrarily emission-controlled so as to be approximately ns is used. Red CW laser having the wavelength of 640 nm, for example, is used as the light emitted from the first laser light source.

The first laser light radiated from the first laser light source is set to have a wavelength of $\lambda 1$ and power P1.

Blue pulse laser can be used as the light from the second laser light source. For example, the blue pulse laser is emitted outward to an object by 10 W at its peak, and has a pulse width of 5 ps or less and a repetition frequency of approximately 1 GHz or more. For example, blue pulse laser having the wavelength of 405 nm is used.

The second laser light radiated from the second laser light source is set to have a wavelength of $\lambda 2$, a pulse width (radiation time) tw2, power P2, and a repetition interval T.

From the viewpoint of the number of photons per unit area and per unit time, the number of photons having a red wavelength and smaller energy per photon (the first laser light source, the wavelength $\lambda 1$) is 1.6 times larger under identical power. When life duration or longer in an excited intermediate state is assumed as a unit time, longer pulse width is equivalent to an increase of the substantive number of photons which is sensed by electrons in molecules of the recording material.

Accordingly, when a process in which electrons in the molecules of the recording material are two(multi)-photon-excited by a mutual effect with photons is considered, it can be expected that large excitation by two photons having different wavelengths occurs. That is, not only an occurrence of excitation only by the short wavelength pulse laser (wavelength $\lambda 2$) from the second laser light source but also an occurrence of excitation by the second laser light (wavelength $\lambda 2$) and the first laser light (wavelength $\lambda 1$) can be expected.

A case where a polymer resin is used as the recording material in the volume recording type optical information recording medium is described as an example. When covalent bonding energy (approximately 3.0 eV) among atoms is considered in polymeric molecules which constitute the recording layer, it is presumed that it is difficult that molecule fragmentation by disassociation of the covalent bond is directly produced by the two-photon absorption using only the first laser light (wavelength $\lambda 1$). On the other hand, an occurrence of direct fragmentation of the recording material can be expected by the two-photon absorption using only the second laser light (wavelength $\lambda 2$) and the two-photon absorption using the second laser light (wavelength $\lambda 2$) and the first laser light (wavelength $\lambda 1$). As a result, highly-efficient recording especially by the second laser light source can be realized.

Thus, in the recording method of the embodiment, the two-photon absorption efficiency is improved by long wavelength light and direct fragmentation of molecules is produced by short wavelength light in the hole formation. As a result, smaller laser power of the short wavelength light source can be realized and the hole formation can be realized with high controllability by the two-photon absorption phenomenon in the overlapping time of the laser light from the short wavelength light source and the laser light from the long wavelength light source.

Accordingly, a forming position of a hole can be controlled by modulating one of the laser light from the first laser light source and the laser light from the second laser light source or both of the laser light from the first laser light source and the second laser light source. For example, in a state that one laser light is continuously radiated, the other laser light is modulated and radiated, being able to control a forming position of a hole. Further, radiation timing of the laser light from the first laser light source and radiation timing of the laser light from the second laser light source are synchronized and time modulation is performed, being able to control a forming position of a hole.

3. Optical Recording Method of Embodiment: First Example

A first example of a method for recoding information in the optical information recording medium by using the recording apparatus shown in FIG. 1 is described. In the following description, a method for controlling the first laser light source and the second laser light source which are features of this recording method is described.

Figure 2:
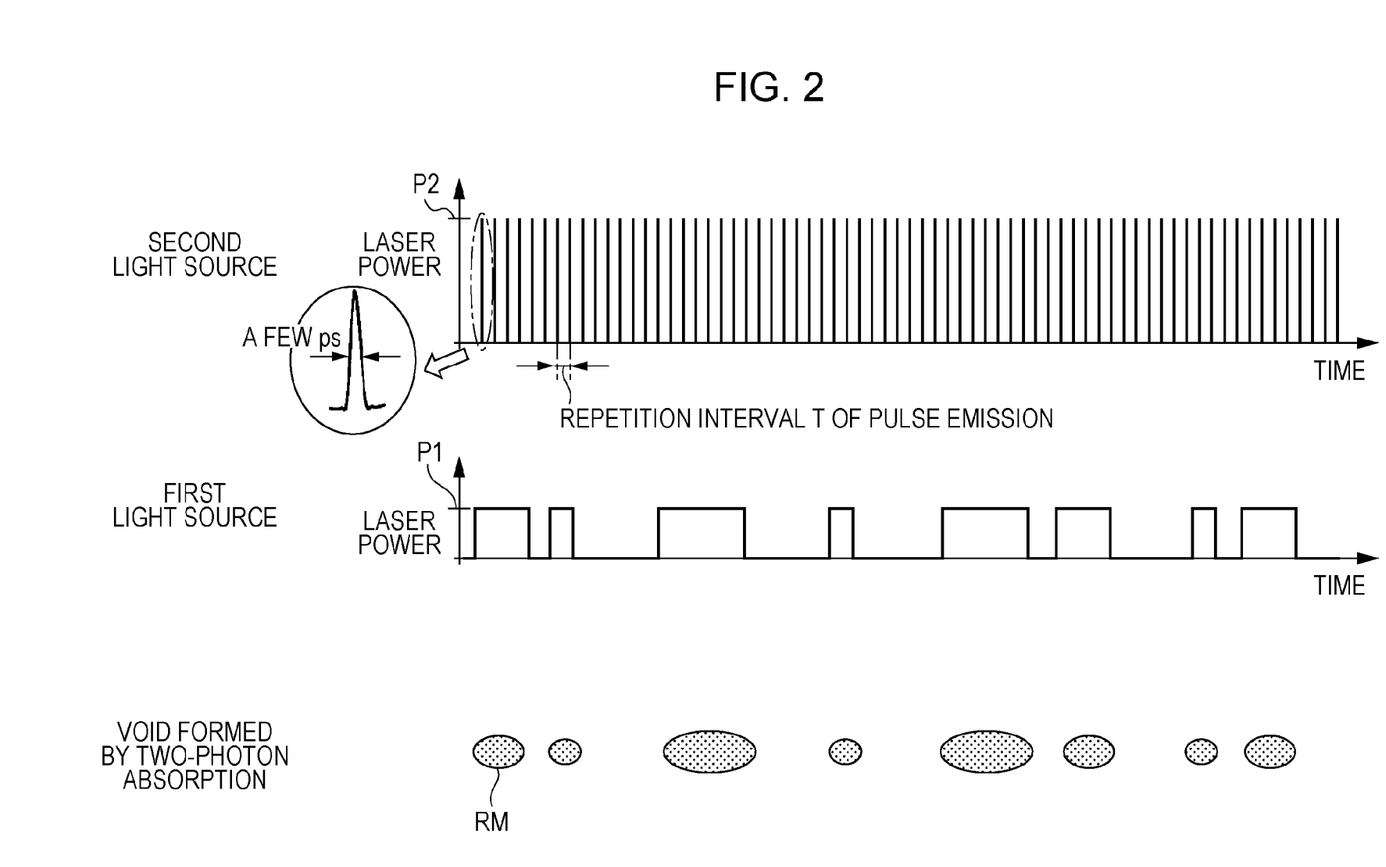
FIG. 2 illustrates emission waveforms of laser light sources in an optical information recording method according to the embodiment.

FIG. 2 shows the first example of the method for controlling the first laser light source and the second laser light source. FIG. 2 shows a relationship between light emission waveforms of the first laser light source and the second laser light source and a recording mark RM (hole) which is formed in the recording layer of the optical information recording medium by the two-photon absorption.

In the example shown in FIG. 2, pulse laser is continuously radiated from the second laser light source and the first laser light source is controlled so as to modulate radiation time.

Pulse laser having a wavelength $\lambda 2$ is continuously radiated from the second laser light source with peak power P2, a repetition interval T, and a pulse width tw2. Then, continuous wave (CW) laser having peak power P1 and a wavelength λ1 is radiated from the first laser light source while modulating time. Further, the radiation timing of the first laser light source is controlled as shown in FIG. 2. Here, the time modulation performed by controlling the first laser light source is arbitrarily set depending on information which is to be recorded.

Accordingly, the laser light from the first laser light source and the laser light from the second laser light source are simultaneously radiated to the recording layer, a focal point of the CW laser from the first laser light source and a focal point of the pulse laser from the second laser light source are overlapped with each other, and these laser light having different wavelengths from each other are simultaneously radiated to the identical focal point.

Thus, two kinds of light having different wavelengths from each other are simultaneously radiated to the identical part of the recording medium by using the first laser light source of the wavelength of λ1 and the second laser light source of the wavelength of λ2, being able to arbitrarily record information. That is, in the example shown in FIG. 2, the modulation time of the laser light which is radiated from the first laser light source is controlled, being able to easily control the shape of the recording mark RM in an appropriate shape.

When the laser light from the first laser light source and the laser light from the second laser light source are simultaneously radiated, energy radiated to the medium is radiation energy of the sum of the power P1 and the power P2. At this time, large excitation by the two photons having different wavelengths from each other occurs and two-photon absorption occurs in the recording layer of the optical information recording medium. Due to this two-photon absorption, fragmentation of the resin material occurs in the recording layer and thereby a hole is formed. Thus, by irradiating the recording layer of the optical information recording medium with light having the wavelength λ1 and the light having the wavelength of λ2, the two-photon absorption of the laser light can be increased and a recording mark RM having a predetermined size can be formed.

In the example shown in FIG. 2, a relationship between the wavelength λ1 of the first laser light source and the wavelength λ2 of the second laser light source is expressed as λ1>500 nm>λ2. When $1/\lambda1+1/\lambda2=1/\lambda0$ is set, λ0 satisfies λ0<300 nm. On such condition, optical energy given by the two-photon absorption using the photon of the wavelength λ1 and the photon of the wavelength λ2 is equivalent to optical energy of one-photon absorption using a photon of the wavelength λ0, being equivalent to 4.0 eV. This is an amount by which the covalent bond among atoms in the recoding material described above can be easily cut.

Further, the peak power P1 of the first laser light source and the peak power P2 of the second laser light source satisfy a relationship of P1<P2.

The pulse width (radiation time) tw2 of the second laser light source is set to be less than the radiation time tw1 of the first laser light (tw2<tw1). The repetition interval T is set to be less than the radiation time tw1 of the first laser light (T<tw1). For example, the first laser light source is coherent light of λ1>600 nm or more, the power P1 is 0.5 W or more at a peak value, and tw1>1 ns is satisfied. Further, the second laser light source emits coherent light of λ2<450 nm or less, the peak power P2 is 3 W or more as the peak value, and tw2>1 ps is satisfied, for example.

Sufficient resolution energy for the hole formation by the two-photon absorption is not produced only by the laser light of the long wavelength (λ1). Further, the two-photon absorption efficiency is small in a case using only the laser light of the short wavelength (λ2), and therefore larger peak power is demanded for forming a hole.

By assembling the laser light of the short wavelength (λ2) and the laser light of the long wavelength (λ1), energy sufficient for the hole formation can be produced by the two-photon absorption and the occurrence efficiency of the two-photon absorption can be improved, as well. Accordingly, the peak power of the light source can be reduced.

According to the above described method, the two-photon absorption is produced in the recording material by using long wavelength light having large two-photon absorption efficiency and short wavelength light having large photon energy, that is, using two light sources having different wavelengths, being able to realize low power recording which is not realized by single short wavelength light. Further, highly-efficient hole formation which has a superior input energy ratio and is not realized by single long wavelength light can be realized. As a result, power consumption of the whole of the light source can be lowered. Taking an advantage of the hole formation on a multiplexing part of the two light sources, emission of the light source is controlled so as to perform the hole formation with high controllability. Accordingly, high quality recording mark formation and high quality signal reproduction can be realized.

4. Optical Recording Method of Embodiment: Second Example

Figure 3:
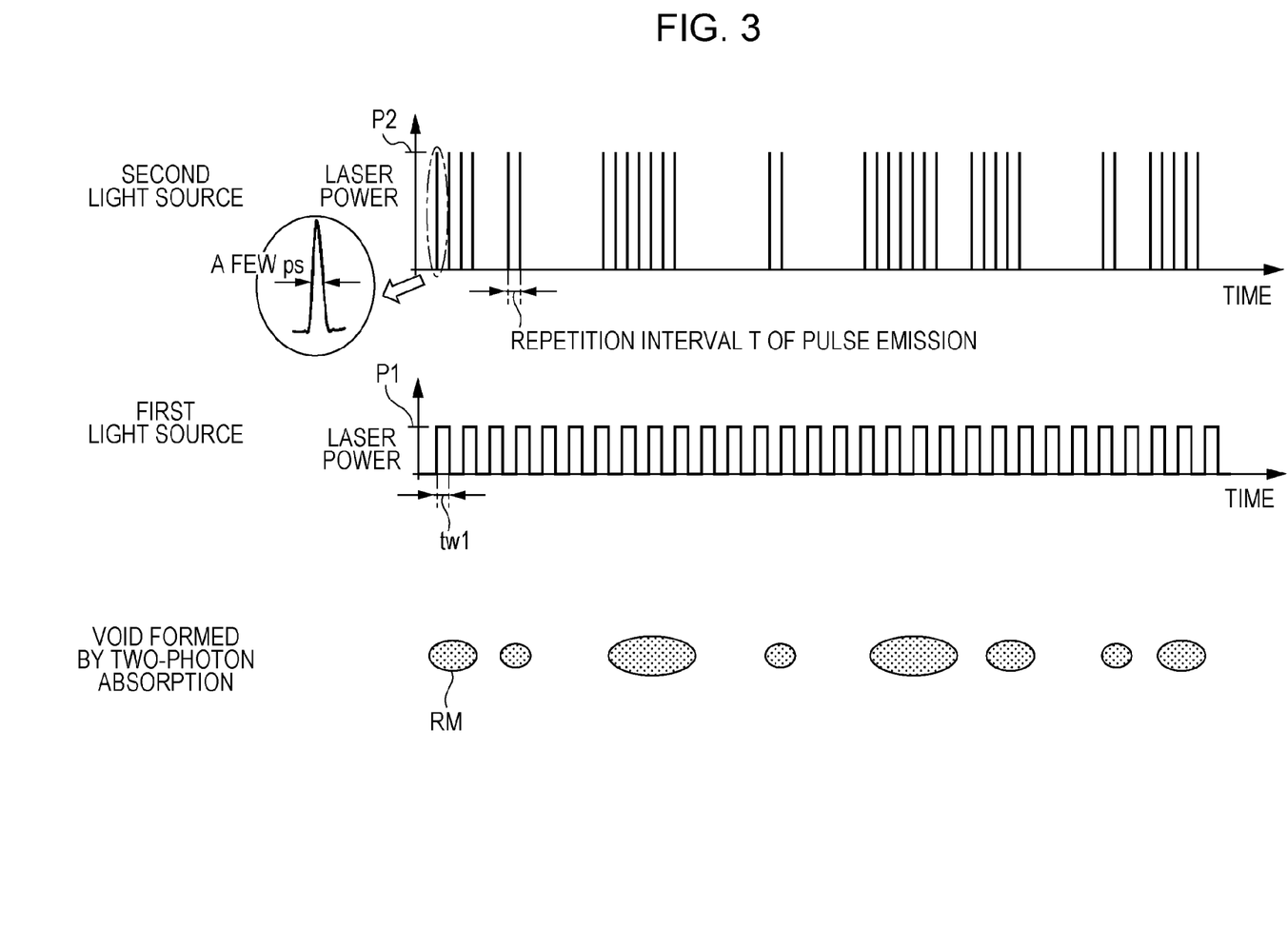
FIG. 3 illustrates emission waveforms of laser light sources in an optical information recording method according to the embodiment.

A second example of the recording method of the embodiment is now described. FIG. 3 shows the second example of the method for controlling the first laser light source and the second laser light source. FIG. 3 shows a relationship between light emission waveforms of the first laser light source and the second laser light source and a recording mark RM (hole) which is formed in the recording layer of the optical information recording medium by the two-photon absorption.

In an example shown in FIG. 3, emission of the laser light from the first laser light source is periodically controlled so as to make the laser light have an arbitrary pulse width (radiation time) tw1. Then, the radiation time is modulated by controlling the pulse laser radiated from the second laser light source.

The CW laser is radiated from the first laser light source by periodically controlling emission of the CW laser having the wavelength of λ1 so that the CW laser has the peak power P1 and the pulse width (radiation time) tw1. Accordingly, such state that the first light source continuously emits pulse laser having the wavelength pulse width tw1 is produced, as shown in FIG. 3. Further, pulse laser having the peak power P2, the repetition interval T, the pulse width tw2, and the wavelength of λ2 is radiated from the second laser light source while controlling timing as shown in FIG. 3. The time modulation performed by controlling the second laser light source is arbitrarily set depending on information which is to be recorded.

At this time, on the recording layer of the medium, the focal point of the pulse laser of the second laser light source overlaps with the focal point of the CW laser of the first laser light source. Thus, the laser light having different wavelengths from each other are simultaneously radiated to an identical focal point.

Thus, the recording layer of the medium is simultaneously irradiated with the laser light from the first laser light source and the laser light from the second laser light source, the focal point of the CW laser of the first laser light source and the focal point of the pulse laser of the second laser light source are overlapped with each other, whereby the laser light having different wavelengths from each other are simultaneously radiated to an identical focal point.

Thus, information recording can be performed by simultaneously radiating two kinds of light having different wavelengths from each other on the identical part of the recording medium with the first laser light source of the wavelength of $\lambda 1$ and the second laser light source of the wavelength of $\lambda 2$. That is, in the example shown in FIG. 3, emission of the first laser light source is periodically controlled by the pulse width tw1 and the modulation time of the laser light radiated from the second laser light source is controlled, being able to easily control a shape of the recording mark RM in an appropriate shape.

Conditions of this example are same as those of the first example described above as the relationship between the wavelength $\lambda 1$ of the first laser light source and the wavelength $\lambda 2$ of the second laser light source is expressed as $\lambda 1>500$ nm$>\lambda 2$, and when $1/\lambda 1+1/\lambda 2=1/\lambda 0$ is set, $\lambda 0$ satisfies $\lambda 0<300$ nm. This is equivalent to optical energy by which covalent bond among atoms of the recording material described above can be easily cut as is the case with the first example.

The peak power P1 of the first laser light source and the peak power P2 of the second laser light source satisfy the relationship of P1<P2.

The pulse width (radiation time) tw2 of the second laser light source is set to be less than the radiation time tw1 of the first laser light source (tw2<tw1). The repetition interval T is set to be less than the radiation time tw1 of the first laser light source (T<rw1). For example, the first laser light source emits coherent light of $\lambda 1>600$ nm or more, the power P1 is 0.5 W or more at a peak value, and tw1>1 ns is satisfied. Further, the second laser light source emits coherent light of $\lambda 2<450$ nm or less, the power P2 is 3 W or more at a peak value, and tw2>1 ps is satisfied, for example.

In the second example, the first laser light source periodically continuously emits light, so that the shape of the recording mark RM can be controlled by switching the second laser light source. That is, when time-modulated pulse laser from the second laser light source is radiated to the medium simultaneously with the light which is continuously radiated from the first laser light source, two-photon absorption occurs on the recording layer. Then, fragmentation of the resin material occurs in the recording layer by this two-photon absorption and thereby a hole is formed. In the case where the pulse light from the second laser light source is time-modulated, as well, a hole is formed by the two-photon absorption during time in which the pulse light continuously emitted from the second laser light source and the CW laser from the first laser light source are simultaneously radiated. Then, the recording mark RM is formed on the recording layer and information is recorded.

5. Optical Recording Method of Embodiment: Third Example

Figure 4:
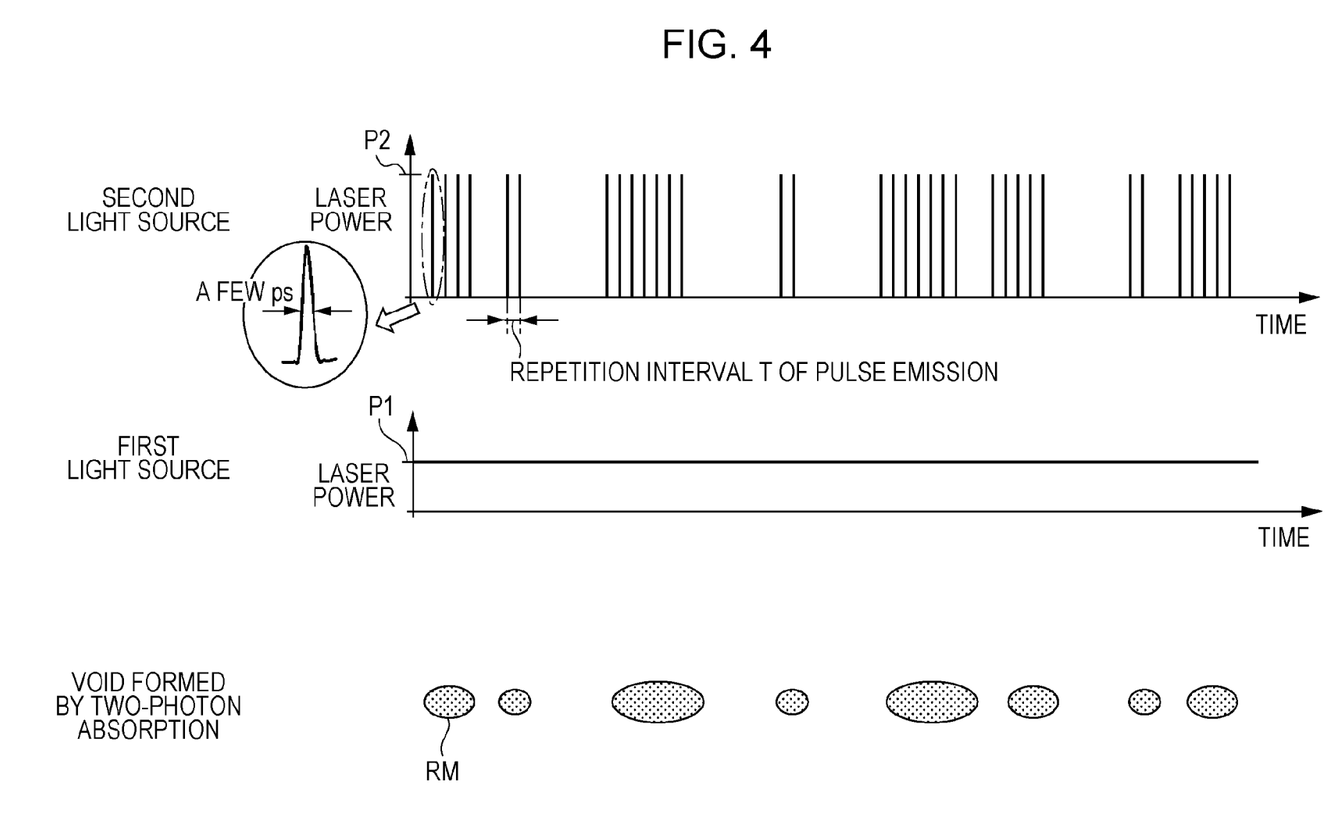
FIG. 4 illustrates emission waveforms of laser light sources in an optical information recording method according to the embodiment.

A third example of the recording method according to the embodiment is now described. FIG. 4 shows the third example of the method for controlling the first laser light source and the second laser light source. FIG. 4 shows a relationship between light emission waveforms of the first laser light source and the second laser light source and a recording mark RM (hole) which is formed in the recording layer of the optical information recording medium by the two-photon absorption.

In the example shown in FIG. 4, the CW laser is continuously radiated from the first laser light source and the pulse laser from the second laser light source is controlled so as to modulate the radiation time.

The CW laser having the peak power P1 and the wavelength $\lambda 1$ is continuously radiated from the first laser light source. Further, the pulse laser having the peak power P2, the repetition interval T, the pulse width tw2, and the wavelength $\lambda 2$ is radiated from the second laser light source while controlling timing as shown in FIG. 4. The time modulation by controlling the second laser light source is arbitrarily set depending on information which is to be recorded.

At this time, the focal point of the pulse laser from the second laser light source is overlapped with the focal point of the CW laser from the first laser light source and thus the laser light having different wavelengths from each other are simultaneously radiated to an identical focal point.

Accordingly, the laser light from the first laser light source and the laser light from the second laser light source are simultaneously radiated to the recording layer, the focal point of the CW laser from the first laser light source and the focal point of the pulse laser from the second laser light source are overlapped with each other, and thus these laser light having different wavelengths from each other are simultaneously radiated on the identical focal point.

Thus, information recording can be performed by simultaneously radiating two kinds of light having different wavelengths from each other on the identical part of the recording medium with the first laser light source of the wavelength of $\lambda 1$ and the second laser light source of the wavelength of $\lambda 2$. That is, in the example shown in FIG. 4, emission of the first laser light source is periodically controlled by the pulse width tw1 and the modulation time of the laser light radiated from the second laser light source is controlled, being able to easily control the shape of the recording mark RM in an appropriate shape.

Conditions of this example are same as those of the first example described above as the relationship between the wavelength $\lambda 1$ of the first laser light source and the wavelength $\lambda 2$ of the second laser light source is expressed as $\lambda 1>500$ nm$>\lambda 2$, and when $1/\lambda 1+1/\lambda 2=1/\lambda 0$ is set, $\lambda 0$ satisfies $\lambda 0<300$ nm. This is equivalent to optical energy by which covalent bond among atoms of the recording material described above can be easily cut as is the case with the first and second examples.

The peak power P1 of the first laser light source and the peak power P2 of the second laser light source satisfy the relationship of P1<P2.

For example, the first laser light source emits coherent light of $\lambda 1>600$ nm or more and the power P1 is 0.5 W or more at a peak value. Further, the second laser light source emits coherent light of $\lambda 2<450$ nm or less, the power P2 is 3 W or more at a peak value, and tw2>1 ps is satisfied, for example.

In the third example, the first laser light source continuously emits light, so that the shape of the recording mark RM can be controlled by switching the second laser light source. That is, when time-modulated pulse laser from the second laser light source is radiated to the medium simultaneously with the CW laser from the first laser light source, two-photon absorption occurs on the recording layer. Then, fragmentation of the resin material occurs in the recording layer by this two-photon absorption and thereby a hole is formed. In the case where the pulse light from the second laser light source is time-modulated, as well, a hole is formed by the two-photon absorption during time in which the pulse light continuously emitted from the second laser light source and the CW laser light from the first laser light source are simultaneously radiated. Thus, the recording mark RM is formed on the recording layer and information is recorded during time in which the light beams from the two light sources are simultaneously radiated.

As described above, in the optical information recording method of the first to third examples, the laser light from the first laser light source and the laser light from the second laser light source are simultaneously radiated when information is recorded in the volume recording type optical information recording medium. Further, the laser light from the third laser light source is used as laser for controlling the position of the objective lens. Further, the laser light from the fourth laser light source is used as reproducing laser in the reproduction.

The laser light from the first laser light source and the laser light from the second laser light source are simultaneously radiated and two-photon absorption is produced in the recording material with the light sources respectively emitting long wavelength light having large two-photon absorption efficiency and short wavelength light having large photon energy, that is, with two light sources having different wavelengths. Accordingly, the low power recording which is not realized by a single light source of a short wavelength can be performed and the hole formation with a superior input energy ratio which is not realized by a single light source of a long wavelength can be realized. Consequently, power consumption of the whole light source can be lowered.

Further, a hole is formed at a multiplexing part of two light sources of the first laser light source and the second laser light source, so that the hole formation can be performed with high controllability by controlling emission of the light source. Accordingly, high quality recording mark formation and high quality signal reproduction can be performed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical information recording method, comprising:
    emitting light having a wavelength $\lambda 1$ from a first light source with a pulse width of time tw1 or more and power P1;
    emitting light having a wavelength $\lambda 2$ from a second light source with a pulse width of time tw2, a repetition interval T, and power P2; and
    performing information recording by simultaneously irradiating an identical part of a recording medium with the light from the first light source and the light from the second light source; wherein
    the wavelength $\lambda 1$ and the wavelength $\lambda 2$ satisfy $\lambda 1>500$ nm$>\lambda 2$ and $\lambda 0$ which is expressed as $1/\lambda 1+1/\lambda 2=1/\lambda 0$ satisfies a relationship of $\lambda 0<300$ nm, and
    emission of the first light source and emission of the second light source satisfy relationships of tw2<tw1, T<tw1, and P2>P1.

2. The optical information recording method according to claim 1, further comprising arbitrarily modulating radiation time tw1 of the first light source and making the second light source continuously emit the light with the pulse width tw2 and the repetition interval T.

3. The optical information recording method according to claim 1, further comprising periodically modulating the emission of the first light source with a pulse width of time tw1 or less and arbitrarily time-modulating ON/OFF of the emission of the second light source with the pulse width tw2 and the repetition interval T.

4. The optical information recording method according to claim 1, further comprising continuously emitting the light from the first light source and arbitrarily time-modulating ON/OFF of the emission of the second light source with the pulse width tw2 and the repetition interval T.

5. The optical information recording method according to claim 1, further comprising radiating light that is coherent light of $\lambda 2<450$ nm or less, the power P2 of 3 W or more at a peak value, and tw2>1 ps, from the second light source.

6. The optical information recording method according to claim 1, further comprising radiating light that is coherent light of $\lambda 1>600$ nm or more, the power P1 of 0.5 W or more at a peak value, and tw1>1 ns, from the first light source.

7. An optical information reproducing method, comprising optically reproducing a signal of a recording mark that is a hole, the hole being formed by simultaneously irradiating an identical part of a recording medium with light having a wavelength $\lambda 1$ and radiated from a first light source and light having a wavelength $\lambda 2$ and radiated from a second light source, by light from a third light source, the light having an approximately same wavelength as the wavelength $\lambda 2$ of the light from the second light source.

8. An optical information recording apparatus, comprising:
    a first light source configured to emit light having a wavelength $\lambda 1$ with a pulse width of time tw1 or more and power P1; and
    a second light source configured to emit light having a wavelength $\lambda 2$ with a pulse width of time tw2, a repetition interval T, and power P2; wherein
    the wavelength $\lambda 1$ and the wavelength $\lambda 2$ satisfy $\lambda 1>500$ nm$>\lambda 2$ and $\lambda 0$ which is expressed as $1/\lambda 1+1/\lambda 2=1/\lambda 0$ satisfies a relationship of $\lambda 0<300$ nm,
    emission of the first light source and emission of the second light source satisfy relationships of tw2<tw1, T<tw1, and P2>P1, and
    information recording is performed by simultaneously irradiating an identical part of a recording medium with the light from the first light source and the light from the second light source.

9. An optical information recording and reproducing apparatus, comprising:
    a first light source configured to emit light having a wavelength $\lambda 1$ with a pulse width of time tw1 or more and power P1;
    a second light source configured to emit light having a wavelength $\lambda 2$ with a pulse width of time tw2, a repetition interval T, and power P2; and
    a third light source configured to emit light having an approximately same wavelength as the wavelength $\lambda 2$ of the light from the second light source; wherein
    the wavelength $\lambda 1$ and the wavelength $\lambda 2$ satisfy $\lambda 1>500$ nm$>\lambda 2$ and $\lambda 0$ which is expressed as $1/\lambda 1+1/\lambda 2=1/\lambda 0$ satisfies a relationship of $\lambda 0<300$ nm,
    emission of the first light source and emission of the second light source satisfy relationships of tw2<tw1, T<tw1, and P2>P1,
    information is recorded by simultaneously irradiating an identical part of a recording medium with the light from the first light source and the light from the second light source, and
    the information that is recorded is optically reproduced by the light from the third light source.

* * * * *